(12) United States Patent
Li

(10) Patent No.: US 6,909,670 B1
(45) Date of Patent: Jun. 21, 2005

(54) ULTRASONIC SENSOR ASSEMBLY FOR A VEHICLE REVERSING RADAR

(76) Inventor: Shih-Hsiung Li, 2F-7, No. 23, Sec. 1, Hangchow S. Rd., Taipei (TW)

(*) Notice: Subject to any disclaimer, the term of this patent is extended or adjusted under 35 U.S.C. 154(b) by 0 days.

(21) Appl. No.: 10/804,115

(22) Filed: Mar. 19, 2004

(51) Int. Cl.7 ................................................. H04R 1/34
(52) U.S. Cl. ......................................... 367/140; 73/649
(58) Field of Search ............................... 367/140, 173, 367/176; 73/649

(56) References Cited

U.S. PATENT DOCUMENTS

| | | | | |
|---|---|---|---|---|
| 3,416,628 A | * | 12/1968 | Bschorr et al. | 181/142 |
| 4,181,193 A | * | 1/1980 | Isaac | 181/185 |
| 4,190,784 A | * | 2/1980 | Massa | 310/324 |
| 4,713,799 A | * | 12/1987 | Phelan et al. | 367/140 |
| 2004/0060357 A1 | * | 4/2004 | Fukuda et al. | 73/626 |

* cited by examiner

*Primary Examiner*—Ian J. Lobo
(74) *Attorney, Agent, or Firm*—Dennison, Schultz, Dougherty & MacDonald

(57) ABSTRACT

An ultrasonic sensor assembly for a vehicle reversing radar has an ultrasonic sensor (10) with two electric wires (12). A sleeve (20) is made of rubber material and has a chamber (22) receiving the sensor (10). A cone-shaped opening (24) is defined at a front end of the chamber (22). A guide wave cone (30) is provided at the center of the cone-shaped opening (24) and abuts the sensor (10). By using the sensor assembly, the vehicle reversing radar can have a high precision with a long detectable distance in a concentrated area.

6 Claims, 5 Drawing Sheets

ULTRASONIC SENSOR ASSEMBLY FOR A VEHICLE REVERSING RADAR

BACKGROUND OF THE INVENTION

1. Field of the Invention

The present invention relates to a vehicle reversing radar, and more particularly to an ultrasonic sensor assembly for the radar.

2. Description of Related Art

A conventional vehicle reversing radar is generally installed at a rear bumper of a vehicle. The vehicle reversing radar has an ultrasonic sensor, in which a ceramic chip in a polarized electric field, due to the anti-piezoelectricity, will make an aluminum housing vibrate and send ultrasonic signals, and will receive the reflected ultrasonic signals from an obstacle within an effective distance. Thus, a driver will know the situation behind the vehicle during reversing without having to stop looking to the front of the vehicle.

A good ultrasonic sensor should send ultrasonic signals in a concentrated area and generates intense reflections from the obstacle to achieve a sensitive detecting effect. With reference to FIG. 5, a conventional ultrasonic sensor's sensitive area, under a test reception sensitivity of −6 dB, has a linear distance along its axis of 250 cm, and a sensitive included angle at 200 cm above 60 degrees. Therefore, the conventional sensor's performance has a low precision.

In some vehicles, a plurality of conventional ultrasonic sensors is installed on the front and rear bumpers. A monitor is provided under an instrument panel of the vehicle for displaying which ultrasonic sensor has detected an obstacle. However, as the conventional ultrasonic sensor has a wide sensitive included angle, they must be respectively installed at ends of the bumpers for preventing the ultrasonic signals from interfering with each other. Nevertheless, the distances between the respective ultrasonic sensors are so big that the detecting precision is still low.

Furthermore, when parking the vehicle, the ultrasonic sensors often detect other parked vehicles beside the vehicle as obstacles, so the driver may be confused by these false alarms.

Therefore, the invention provides an improved ultrasonic sensor to mitigate or obviate the aforementioned problems.

SUMMARY OF THE INVENTION

The main objective of the present invention is to provide an ultrasonic sensor for a vehicle reversing radar which has a high precision with a long sensitive distance and a small sensitive included angle.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
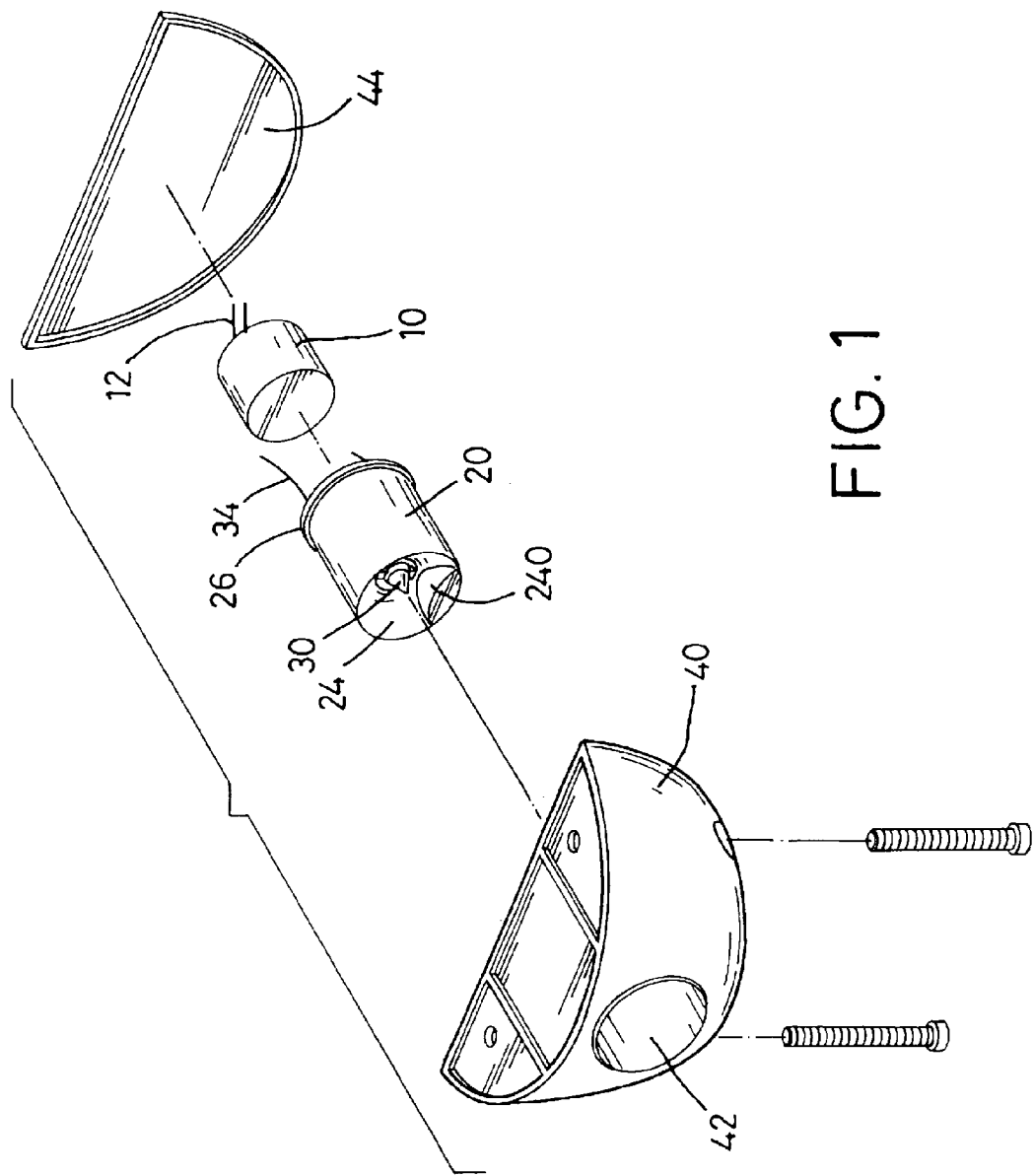
FIG. 1 is an exploded perspective view of an ultrasonic sensor assembly in accordance with the present invention.
Figure 2:
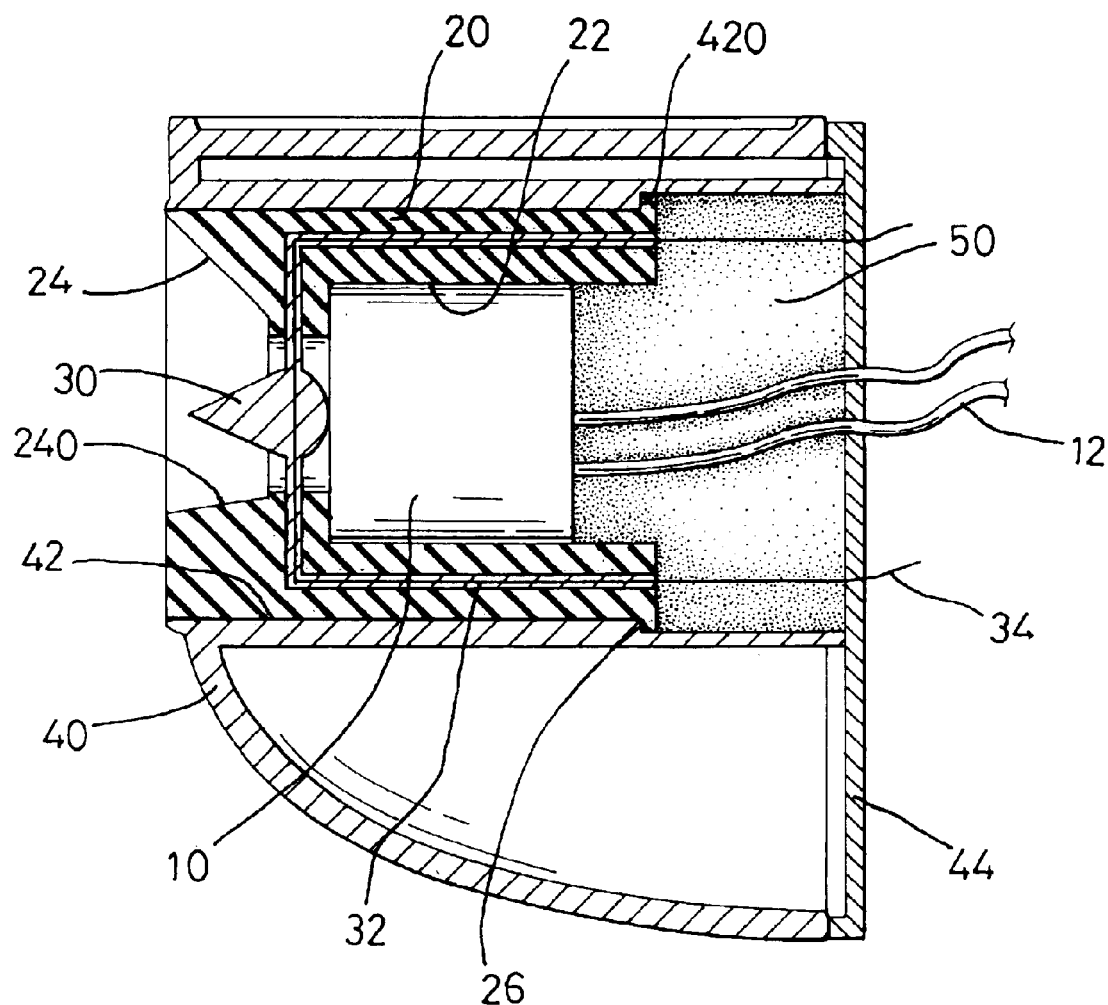
FIG. 2 is a cross sectional view of the ultrasonic sensor assembly in FIG. 1.

With reference to FIGS. 1–2, an ultrasonic sensor assembly for a vehicle reversing radar in accordance with the present invention is composed of a sensor (10), a sleeve (20), a guide wave cone (30), and a housing (40).

The ultrasonic sensor (10) has a structure the same as the conventional sensor, and two electric wires (12) extend out from the sensor (10).

The sleeve (20), generally made of rubber, has a chamber (22) defined therein for receiving the sensor (10). A cone-shaped opening (24) is defined at a front end thereof, and a barrier (240) is formed at a lower side of the opening (24) (for preventing ultrasonic signals reflecting from the ground to cause false alarms). A flange (26) is formed at a rear end of the sleeve (20).

The guide wave cone (30) with a sharp tip (not numbered) is mounted at a center of the opening (24) by a U-like bracket (32) in the sleeve (20). The sharp guide wave cone (30) has a cross section shaped somewhat as a water droplet and abuts the sensor (10). A heating wire (34) extends through the bracket (32) and out from two free ends of the bracket (32). In winter, snow may accumulate on the sensor (10) and the heating wire (34) can be electrified to thaw the snow.

The housing (40) has a passage (42) defined therethrough for receiving the sleeve (20). A back cover (44) is provided at a rear side of the housing (40) to enclose the sensor (10) and the sleeve (20) in the housing (40).

In the assembled status as illustrated in FIG. 2, the guide wave cone (30) is mounted on the U-like bracket (32) integrated with the sleeve (20) and protruded from the center of the cone-shaped opening (24). The heating wire (34) extends along the bracket (32) backwards and out from the back cover (44). The sleeve (20) is positioned in the housing (40) by the flange (26) abutting a shoulder (420) of the passage (42). The electric wires (1 2) and heating wires (34) extend out from apertures (not shown) of the back cover (44). A cushion (50), made of resin or other soft material, is provided between the sleeve (20) and the back cover (44), so the sleeve (20) and sensor (10) can be stably received in the housing (40).

Figure 3:
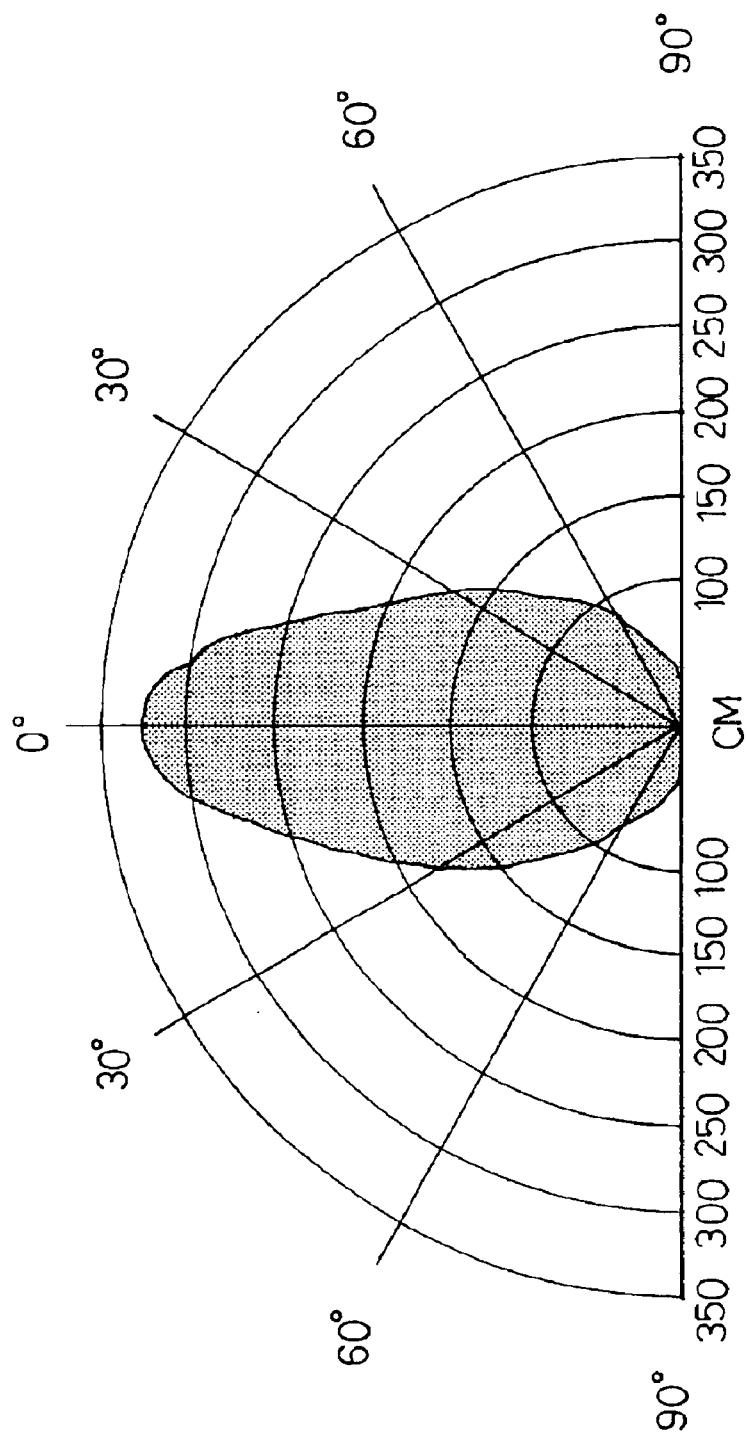
FIG. 3 is a diagram of a sensitive area of the ultrasonic sensor in accordance with the invention.

With reference to FIG. 3, under a test reception sensitivity of −6 dB, a sensitive area of the sensor (10) with the guide wave cone (30) is illustrated in FIG. 3. The sensor (10) has a linear sensitive distance along the axis above 320 cm, and a sensitive angle at 200 cm below 50 degrees. Compared with the conventional sensor, the present invention has a long detectable distance in a concentrated area, so the performance has a high precision.

Figure 4:
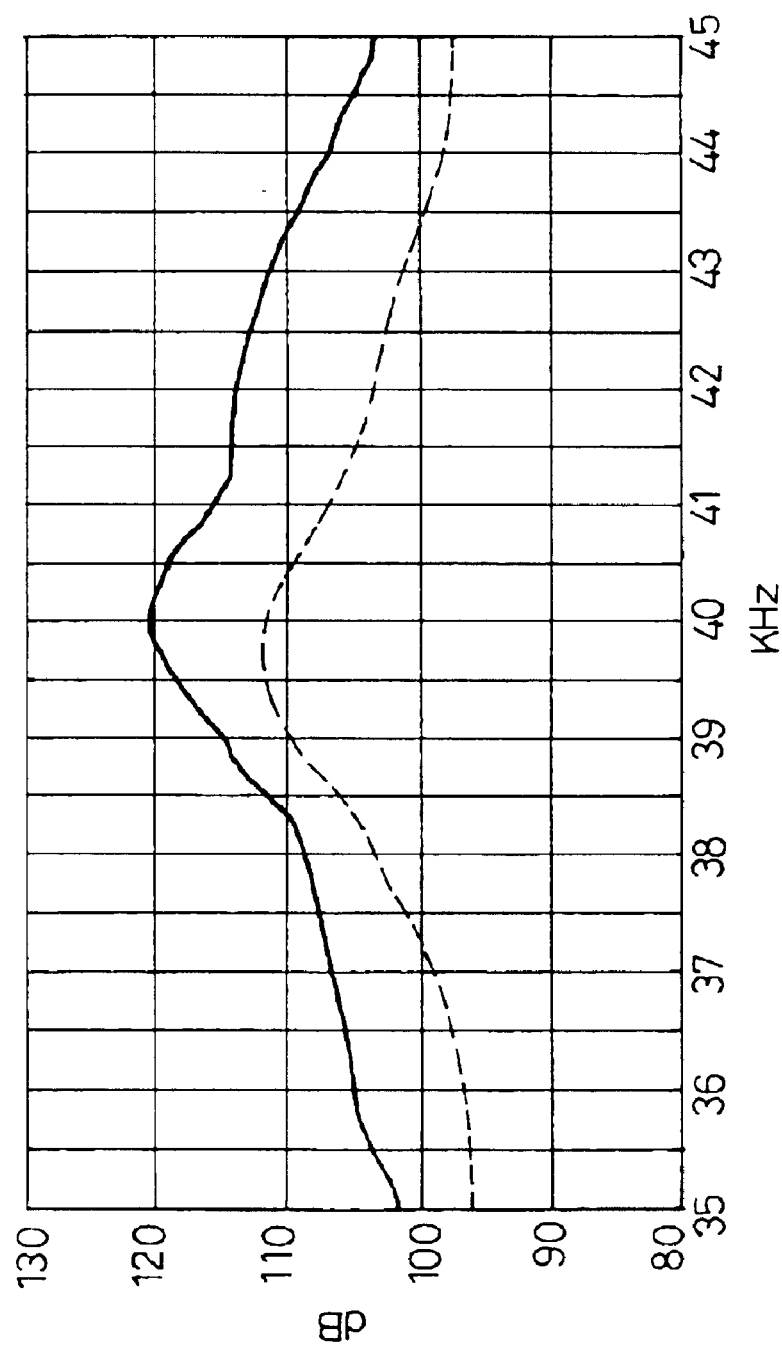
FIG. 4 is a diagram of frequency-db comparison of the ultrasonic sensors with and without a guide wave cone.
Figure 5:
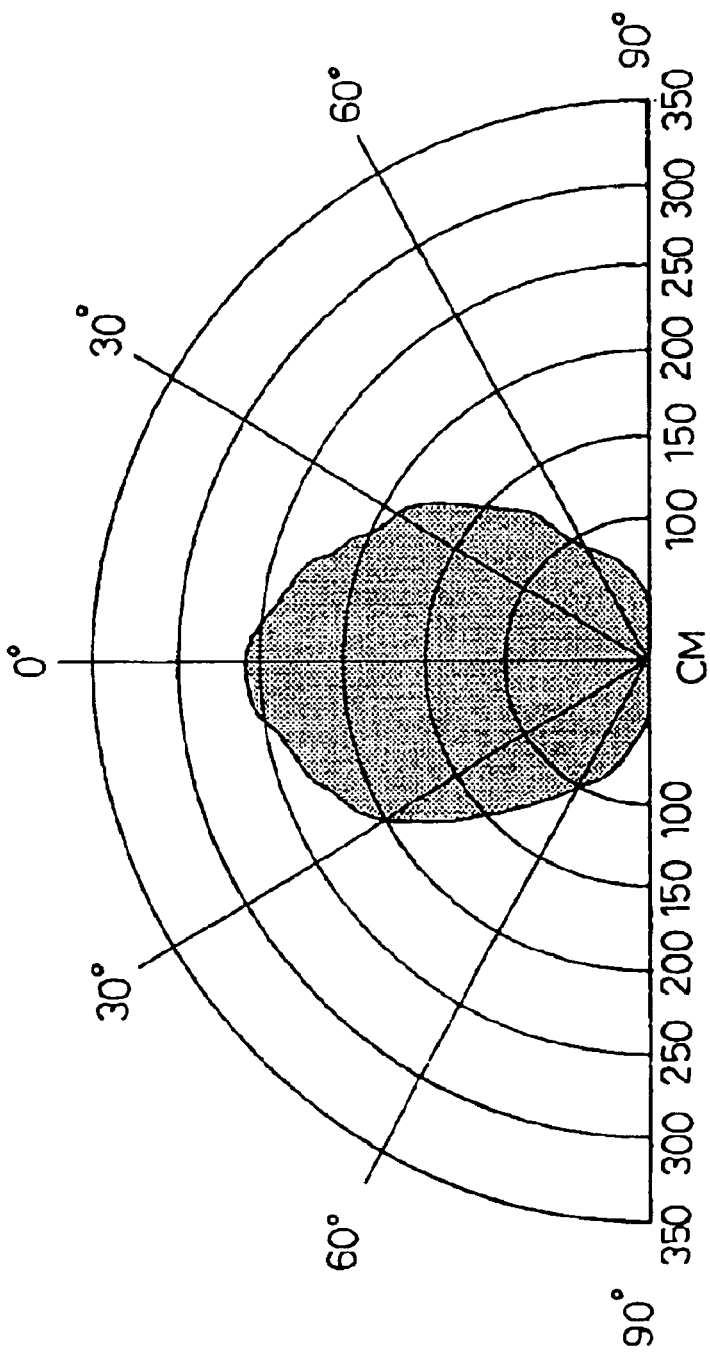
FIG. 5 is a diagram of a sensitive area of a conventional ultrasonic sensor.

FIG. 4 illustrates a detecting effect comparison between the sensors with and without the guide wave cone, wherein the solid line illustrates the sensor with the guide wave cone, and the dashed line illustrates the sensor without the guide wave cone. As shown in FIG. 4, under a test frequency of about 40 KHz (35–45 KHz), the sensor of the present invention can provide an ultrasonic signal with a dB rate higher than that of the conventional sensor. Therefore, the present invention has a detecting effect better than the conventional sensor.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An ultrasonic sensor assembly for a vehicle reversing radar comprising:

an ultrasonic sensor (10) with two electric wires (12);

a sleeve (20) made of rubber material, the sleeve having a chamber (22) receiving the sensor (10), a U-like bracket integrated in the sleeve (20), and a cone-shaped opening (24) with a center defined at a front end of the chamber (22); and a guide wave cone (30) provided at the center of the cone-shaped opening (24) and mounted on the U-like bracket (32) to abut the sensor (10).

2. The ultrasonic sensor assembly as claimed in claim 1, wherein the sleeve (20) further has a barrier (240) formed at a lower side of the opening (24).

3. The ultrasonic sensor assembly as claimed in claim 2 further comprising a heating wire (34) extending through and out from two free ends of the U-like bracket (32).

4. The ultrasonic sensor assembly as claimed in claim 1 further comprising a housing (40) with a passage (42) for receiving the sleeve (20) and sensor (10), and a back cover (44) provided at a rear side of the housing (40).

5. The ultrasonic sensor assembly as claimed in claim 4, wherein the sleeve (20) has a flange (26) formed at a rear side and abutting a shoulder (420) formed in the passage (42).

6. The ultrasonic sensor assembly as claimed in claim 4 further comprising a cushion (50) provided between the back cover (44) and the sleeve (20).

* * * * *